United States Patent
Baker et al.

(10) Patent No.: US 6,912,010 B2
(45) Date of Patent: Jun. 28, 2005

(54) AUTOMATED LIP SYNC ERROR CORRECTION

(75) Inventors: Daniel G. Baker, Beaverton, OR (US); Thomas L. Tucker, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 490 days.

(21) Appl. No.: 10/123,838

(22) Filed: Apr. 15, 2002

(65) Prior Publication Data

US 2003/0193616 A1 Oct. 16, 2003

(51) Int. Cl.$^7$ .............................................. H04N 9/475
(52) U.S. Cl. ...................... 348/515; 348/512
(58) Field of Search ................. 348/515, 512, 348/705, 706, 521; 370/517, 519; 375/368–371

(56) References Cited

U.S. PATENT DOCUMENTS

| | | | | |
|---|---|---|---|---|
| 5,387,943 A | * | 2/1995 | Silver | 348/512 |
| 5,751,368 A | * | 5/1998 | Cooper | 348/512 |
| 5,751,694 A | * | 5/1998 | Toft | 370/503 |
| 5,894,320 A | * | 4/1999 | Vancelette | 725/138 |
| 5,907,351 A | * | 5/1999 | Chen et al. | 348/14.12 |
| 6,038,000 A | * | 3/2000 | Hurst, Jr. | 375/240.26 |
| 6,211,919 B1 | | 4/2001 | Zink et al. | |
| 6,744,473 B2 | * | 6/2004 | Wells | 348/515 |
| 2003/0142232 A1 | * | 7/2003 | Albean | 348/512 |

* cited by examiner

*Primary Examiner*—Victor R. Kostak
(74) *Attorney, Agent, or Firm*—Francis I. Gray

(57) ABSTRACT

An automated lip sync error corrector embeds a unique video source identifier ID into the video signal from each of a plurality of video sources. The unique video source ID may be in the form of vertical interval time code user bits or in the form of a watermark in an active video portion of the video signal. When one of the video signals is selected, the embedded unique video source ID is extracted. The extracted source ID is used to access a corresponding delay value for an adjustable audio delay device to re-time a common audio signal to the selected video signal. A look-up table may be used to correlate the unique video source ID with the corresponding delay value.

12 Claims, 1 Drawing Sheet

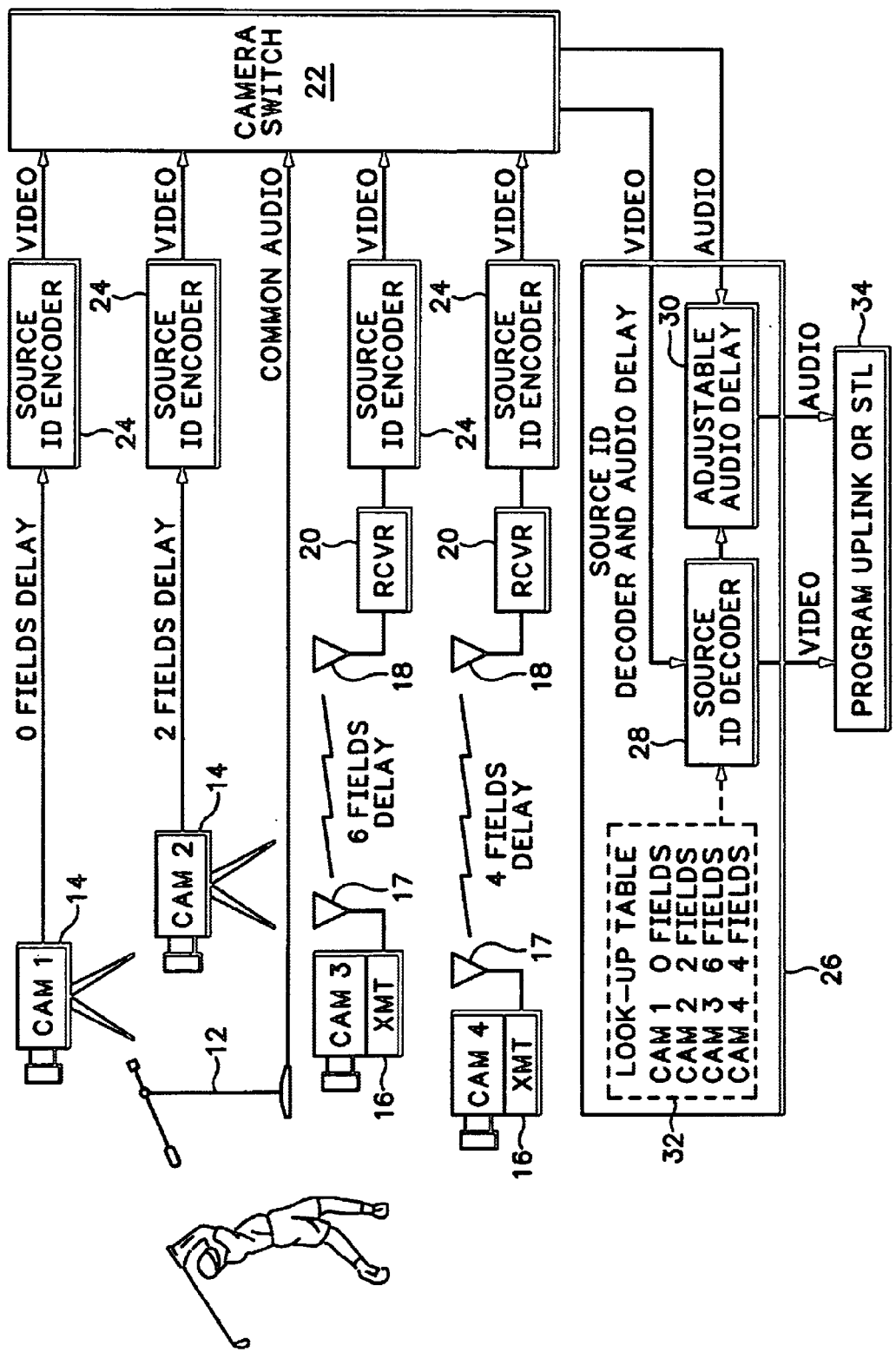

AUTOMATED LIP SYNC ERROR CORRECTION

BACKGROUND OF THE INVENTION

The present invention relates to television technology, and more particularly to automated lip sync error correction using an embedded video source identifier to control an adjustable audio delay.

Audio-to-video (A/V) synchronization is not a new problem. Television sources (video and audio) most often start with their video and audio synchronized such that the audio signal associated with the video signal is created at the same time. One exception to this is a sporting event shot with a long focal-length lens where the audio is received at some distance with a directional microphone. Wireless cameras are sometimes used and possibly field or sub-switched with wired cameras. The wireless camera uses a compression coder/decoder that adds video delay relative to the audio and wired camera video. Since a separate microphone, not part of the wireless camera system, often picks up the audio near the source, there is an additional A/V delay when the wireless camera is switched in place of the wired camera. Additionally the video often undergoes digital processing over video frames, making it arrive even later relative to the audio. Without adding a separate audio delay, the result is the annoying television signal referred to as lip-sync error. This is particularly annoying when the video or action precedes the audio, as in the case described.

What is desired is a method for automated correction of audio-to-video (A/V) lip sync error where a separate microphone is used as the audio source for a plurality of video sources, each video source introducing a different video processing delay, in order to re-time the video and audio signals to a desired relationship.

BRIEF SUMMARY OF THE INVENTION

Accordingly the present invention provides an automated lip sync error correction using an embedded video source identifier (ID) to control an adjustable audio delay. A separate directional microphone acts as an audio source and a plurality of camera, both wired and wireless, act as video sources. The video signal from each video source has a source ID embedded in it, either in the form of vertical interval time code user bits or in the form of a watermark in the active video portion of the video signal, or both. The video sources are coupled to a camera switch that selects a particular one of the video signals. The source ID is extracted from the selected one of the video signals and used to access a look-up table that associates audio time delay to a pre-determined video source delay. The associated audio time delay is applied to an adjustable audio delay device to re-time the audio signal from the audio source with the selected one of the video signals.

The objects, advantages and other novel features of the present invention are apparent from the following detailed description when read in conjunction with the appended claims and attached drawing.

BRIEF DESCRIPTION OF THE SEVERAL VIEWS OF THE DRAWING

The FIGURE is a block diagram view of a television system having multiple cameras with different video delays and a separate common microphone that provides automated lip sync error correction according to the present invention.

DETAILED DESCRIPTION OF THE INVENTION

Referring now to the FIGURE an event being televised, such as a golf match in this illustration, uses a single directional microphone 12 as an audio source and a plurality of cameras 14, 16 as video sources. The cameras 14, 16 include both cameras directly wired to a camera switch 22 and cameras that are wirelessly coupled to the camera switch. Each camera 14, 16 introduces a different amount of video processing delay to the video signal relative to the audio signal from the microphone 12. In particular the wireless cameras 16 introduce a greater video delay than the corresponding wired cameras 14. The wireless cameras 16 generally compression code the video signal, which is then transmitted via a camera antenna 17 wirelessly through a receiver antenna 18 to a receiver 20 where the video signal is compression decoded.

The broadband video signal from each camera 14, 16 is input to a source identifier (ID) encoder 24 prior to being input to the camera switch 22. Each source ID encoder 24 may be either a vertical interval time code (VITC) encoder or a watermark encoder, or both. The VITC encoder encodes the unique source ID for each camera 14, 16 via VITC user bits, as is well known in the art. The watermark encoder, which is especially useful where only the active video portion of the video signal is transmitted, i.e., in digital video signal format, encodes the unique source ID for each camera 14, 16 via a watermark embedded in the active video portion of the video signal using standard watermarking techniques, such as those described in U.S. Pat. No. 6,211,919 issued Apr. 3, 2001 entitled "Transparent Embedment of Data in a Video Signal." The camera switch 22 selects one of the source identified video signals for input to a decoder/delay device 26 together with the common audio signal.

The decoder/delay device 26 includes a source ID decoder 28 into which the selected source identified video signal is input and an adjustable audio delay device 30 into which the audio signal is input. The source ID decoder 28 extracts the source ID from the selected source identified video signal. Based on the source ID the decoder 28 accesses a look-up table 30 to select a pre-determined delay value corresponding to the camera identified by such source ID. The delay value is output by the decoder 28 to the delay device 30 to select the delay to be applied to the audio signal. The video and audio signal outputs from the decoder 28 and delay device 30 are input to a program uplink or satellite television link (STL) 34 in synchronization with each other, i.e., the audio is re-timed with the video. The delay differences between the cameras is generally fixed and known. Therefore the software "look-up" table 32 has the known delays for each camera source ID.

Thus the present invention provides automated lip sync error correction for a television system having a separate audio source for multiple video sources by embedding a source ID into each video signal, selecting one of the video sources for output, extracting the source ID from the video signal for the selected video source, and switching in the appropriate delay for an adjustable audio delay device depending upon the extracted source ID, thereby re-timing the audio signal from the audio source with the selected video signal.

What is claimed is:

1. In a television system having a separate audio source with a plurality of video sources and a switch for selecting one of the video sources for output with the audio source, an automated lip sync error corrector comprising:

means for embedding a unique source identifier into a video signal from each of the video sources before input to the switch;

means for extracting the unique source identifier from the video signal selected by the switch for output; and means for adjusting a delay for an audio signal from the audio source as a function of the extracted unique source identifier to re-time the audio signal with the selected video signal.

2. The corrector as recited in claim 1 wherein the adjusting means comprises:

means for accessing a delay value associated with the extracted unique source identifier; and means for applying the delay value as the delay for the audio signal to re-time the audio signal with the selected video signal.

3. The corrector as recited in claim 1 or 2 wherein the unique source identifier comprises vertical interval time code user bits.

4. The corrector as recited in claim 1 or 2 wherein the unique source identifier comprises a watermark.

5. In a television system having a separate audio source with a plurality of video sources and a switch for selecting one of the video sources for output with the audio source, an automated lip sync error corrector comprising:

an encoder coupled to each video source for embedding a unique source identifier into a video signal from the video source before input to the switch;

a decoder coupled to the switch for extracting the unique source identifier from the video signal selected by the switch for output; and an adjustable audio delay device for delaying an audio signal from the audio source as a function of the extracted unique source identifier to re-time the audio signal with the selected video signal.

6. The corrector as recited in claim 5 wherein the decoder comprises a lookup table having a delay value for each unique source identifier, the delay value for the selected video signal being accessed and applied to the adjustable audio delay device to re-time the audio signal with the selected video signal.

7. The corrector as recited in claim 5 or 6 wherein each encoder comprises a vertical interval time code encoder for embedding unique vertical interval time code user bits into the video signal from the video source.

8. The corrector as recited in claim 5 or 6 wherein each encoder comprises a watermark encoder for embedding a watermark into the video signal from the video source.

9. In a television system having a separate audio source with a plurality of video sources and a switch for selecting one of the video sources for output with the audio source, an automated lip sync error correction method comprising the steps of:

embedding a unique source identifier into a video signal for each video source before input to the switch;

extracting the unique source identifier from the video signal selected by the switch for output; and delaying an audio signal from the audio source as a function of the extracted unique source identifier to re-time the audio signal with the selected video signal.

10. The method as recited in claim 9 wherein the delaying step comprises the steps of:

accessing a look-up table for a delay value associated with the extracted unique source identifier; and applying the delay value to an adjustable audio delay device to re-time the audio signal with the selected video signal.

11. The method as recited in claim 9 or 10 wherein the unique source identifier comprises vertical interval time code user bits.

12. The method as recited in claim 9 or 10 wherein the unique source identifier comprises a watermark.

* * * * *